United States Patent
Heskel et al.

(10) Patent No.: US 8,353,658 B2
(45) Date of Patent: Jan. 15, 2013

(54) DEBRIS-FREE PLASTIC COLLATING STRIP FOR NAILS

(75) Inventors: Isaac H. Heskel, Highland Park, IL (US); Algis P. Suopys, Lindenhurst, IL (US); Michael Starozhitsky, Long Grove, IL (US)

(73) Assignee: Illinois Tool Works Inc., Glenview, IL (US)

( * ) Notice: Subject to any disclaimer, the term of this patent is extended or adjusted under 35 U.S.C. 154(b) by 233 days.

(21) Appl. No.: 11/935,541

(22) Filed: Nov. 6, 2007

(65) Prior Publication Data

US 2008/0131232 A1 Jun. 5, 2008

Related U.S. Application Data

(63) Continuation-in-part of application No. 11/734,684, filed on Apr. 12, 2007, which is a continuation-in-part of application No. 11/383,032, filed on May 12, 2006.

(51) Int. Cl.
*F16B 15/08* (2006.01)

(52) U.S. Cl. .......... 411/444; 411/439; 411/442; 411/443

(58) Field of Classification Search ................. 411/439, 411/442–444
See application file for complete search history.

(56) References Cited

U.S. PATENT DOCUMENTS

| | | |
|---|---|---|
| 1,792,235 A | 2/1931 | Maynard |
| 2,991,477 A | 7/1961 | Hoyle, Jr. et al. |
| 3,082,425 A | 3/1963 | Leslie |
| 3,212,632 A | 10/1965 | Baum et al. |
| 3,303,632 A | 2/1967 | Halstead |
| 3,315,436 A | 4/1967 | Baum et al. |
| 3,342,659 A | 9/1967 | Baum et al. |
| 3,348,669 A | 10/1967 | Powers |
| 3,357,761 A | 12/1967 | Langas et al. |
| 3,358,822 A | 12/1967 | O'Connor |
| 3,432,985 A | 3/1969 | Halstead |
| 3,463,304 A | 8/1969 | Gallee et al. |

(Continued)

FOREIGN PATENT DOCUMENTS

GB 1282359 7/1972

(Continued)

OTHER PUBLICATIONS

Stanley Bostitch Sheather Plus specification sheet, The Stanley Works 2002.

(Continued)

*Primary Examiner* — Roberta Delisle

(74) *Attorney, Agent, or Firm* — Levenfeld Pearlstein, LLC

(57) ABSTRACT

A fastener assembly is for use in an associated fastener driving tool. The assembly includes a row of fasteners arranged substantially parallel to each other. Each fastener has a shank and defines an axis. A collation system is formed from a plastic material that is molded onto and adhered to the fasteners. The plastic material defines a collar portion at least substantially encircling the fastener shank and a connecting portion extending between and connecting adjacent collar portions. The connecting portion includes a bridge and a rib. The bridge is a relatively thin, elongate element spanning adjacent collar portions and the rib is a relatively thick, short element that is disposed at about an upper portion of the bridge. When the fastener is driven from the driving tool, the collar portion remains adhered to the fastener such that the collar portion penetrates the substrate with the fastener. The connecting portion can include a weakened region for separating the connecting portion from the collar.

9 Claims, 8 Drawing Sheets

U.S. PATENT DOCUMENTS

| | | |
|---|---|---|
| 3,471,008 A | 10/1969 | Reich et al. |
| 3,491,389 A | 1/1970 | Leistner |
| 3,592,339 A | 7/1971 | Briggs, Jr. |
| 3,616,083 A | 10/1971 | Mohr |
| 3,625,352 A | 12/1971 | Perkins |
| 3,729,885 A | 5/1973 | Mosetich et al. |
| 3,736,198 A | 5/1973 | Leistner |
| 3,756,391 A | 9/1973 | Keck et al. |
| 3,813,985 A | 6/1974 | Perkins |
| 3,828,924 A | 8/1974 | Perkins |
| 3,861,527 A | 1/1975 | Perkins |
| 3,862,685 A | 1/1975 | Mosetich et al. |
| 3,878,663 A | 4/1975 | Shelton |
| 3,889,450 A | 6/1975 | Danielson et al. |
| 3,904,032 A | 9/1975 | Maier |
| 3,944,068 A | 3/1976 | Maier et al. |
| 3,966,042 A | 6/1976 | Shelton et al. |
| 3,967,727 A | 7/1976 | Jakesch |
| 3,992,852 A | 11/1976 | Schwarz et al. |
| 4,162,728 A | 7/1979 | Uzumcu et al. |
| 4,167,229 A | 9/1979 | Keusch et al. |
| 4,250,996 A | 2/1981 | Bartz |
| 4,298,121 A | 11/1981 | Oide et al. |
| 4,343,579 A | 8/1982 | Shelton et al. |
| 4,370,082 A | 1/1983 | Sundberg |
| 4,383,608 A | 5/1983 | Potucek |
| 4,679,975 A | 7/1987 | Leistner |
| 4,711,980 A | 12/1987 | Leistner |
| 4,804,088 A | 2/1989 | MacDonald |
| 4,805,687 A | 2/1989 | Gall |
| 4,836,372 A | 6/1989 | Shelton |
| 4,867,366 A | 9/1989 | Kleinholz |
| 4,881,643 A | 11/1989 | Pfister |
| 4,932,821 A | 6/1990 | Steffen et al. |
| 4,971,503 A | 11/1990 | Barnell et al. |
| 5,005,699 A | 4/1991 | Kawashima et al. |
| 5,058,228 A | 10/1991 | Wright et al. |
| 5,140,715 A | 8/1992 | Moracelli |
| 5,149,237 A | 9/1992 | Gabriel et al. |
| 5,441,373 A | 8/1995 | Kish et al. |
| 5,443,345 A | 8/1995 | Gupta |
| 5,509,768 A | 4/1996 | Hon |
| 5,522,687 A | 6/1996 | Chen |
| 5,609,712 A | 3/1997 | Takumi |
| 5,713,709 A | 2/1998 | Huang |
| 5,733,085 A | 3/1998 | Shida et al. |
| 5,795,121 A | 8/1998 | Tucker et al. |
| 5,836,732 A | 11/1998 | Gupta et al. |
| 5,865,311 A | 2/1999 | Hentges et al. |
| 5,931,298 A | 8/1999 | Huang |
| 5,931,622 A | 8/1999 | Gupta et al. |
| 6,044,972 A | 4/2000 | Rohrmoser et al. |
| 6,082,536 A | 7/2000 | Ito et al. |
| 6,086,304 A | 7/2000 | Hujishima et al. |
| 6,394,268 B1 | 5/2002 | Dill et al. |
| 6,524,387 B2 | 2/2003 | Arslanouk et al. |
| 6,705,464 B1 | 3/2004 | Yang |
| 6,708,821 B2 | 3/2004 | Tucker et al. |
| 6,758,018 B2 | 7/2004 | Sutt, Jr. |
| 6,779,959 B1 | 8/2004 | Yang |
| 6,823,990 B2 | 11/2004 | Gaudron |
| 6,880,700 B2 | 4/2005 | Osuga et al. |
| 6,880,723 B2 | 4/2005 | Osuga et al. |
| D541,125 S | 4/2007 | Gaudron |
| 7,198,446 B2 | 4/2007 | Yoshizawa et al. |
| 7,556,138 B2 | 7/2009 | Kim |
| 2004/4011872 | 6/2004 | Powers et al. |
| 2007/0237607 A1 | 10/2007 | Lat |
| 2007/0264102 A1 | 11/2007 | Shelton et al. |
| 2007/0264103 A1 | 11/2007 | Shelton et al. |
| 2008/0131232 A1 | 6/2008 | Heskel et al. |
| 2008/0282529 A1 | 11/2008 | Shelton et al. |
| 2008/0317563 A1 | 12/2008 | Shida et al. |

FOREIGN PATENT DOCUMENTS

| | | |
|---|---|---|
| WO | 9742421 | 11/1997 |
| WO | WO 9742421 | 11/1997 |
| WO | WO2007133663 | 11/2007 |
| WO | 2008001790 A1 | 1/2008 |

OTHER PUBLICATIONS

International Search Report for PCT/US2007/011356 dated Oct. 4, 2007.

International Search Report for PCT/US2007/011356 (WO 97/42421).

DEBRIS-FREE PLASTIC COLLATING STRIP FOR NAILS

CROSS-REFERENCE TO RELATED APPLICATION DATA

This application is a continuation-in-part of U.S. patent application Ser. No. 11/734,684, filed Apr. 12, 2007, which is a continuation-in-part of U.S. patent application Ser. No. 11/383,032, filed May 12, 2006.

BACKGROUND OF THE INVENTION

The present invention pertains to collated fasteners. More particularly, the present invention pertains to a collated nail strip formed with a debris-free plastic material for use in a fastener driving tool.

Fast-acting fastener driving tools are in widespread use in the construction industry. Such tools are used in industries ranging from re-fabricated housing construction to luxury residential, commercial and industrial construction. For use in these tools, the nails are assembled in strips that are inserted into a magazine of the tool. The strips are flat and the nails or other fasteners are held parallel to one another. The nails are assembled in a staggered or stepped manner such that the major axis of the nail forms an angle to the longitudinal direction of the strip. In presently known collated nails, the angle is about 0 degrees to 40 degrees and preferably between 15 degrees and 35 degrees. An in-depth discussion of such fasteners is provided in U.S. Pat. No. 5,733,085, to Shida, which is incorporated herein by reference. The strips can also be "rolled" or formed into coils for use in certain tools.

Presently known collated nails are assembled using tape strips or an extruded plastic material. The molten plastic (or polymer) in the plastic-formed strips is cooled and hardens to hold the nails in the strip form for use in the tool. The tape strips are formed from a kraft paper or other paperboard material having a plastic (polymer) adhesive on a surface thereof that is heated on contact with hot nails and, as it cools, adheres to the nails.

Although tape strips have the advantage of minimizing the debris that is formed as the tool is actuated and the nails are driven into the material (typically wood) to be fastened, the plastic strips provide ease of manufacture, especially for larger spaced nails. No materials, other than the nails and the plastic collating material are needed.

However, it has been noted that as the plastic collated nails are driven into the workpiece, the plastic material, not adhering to the nail, shatters and separates from the nail shank. This can create loose debris at the worksite which can result in housekeeping problems.

Accordingly, there is a need for a plastic collation system for strip-formed fasteners that reduces the tendency for the plastic to generate debris as the nail is driven into the workpiece. Desirably, the collation system reduces the tendency for the nail strip to corrugate or advance on itself in the tool magazine. More desirably, such a system minimizes the amount that the strip can flex, and maximizes the adhesion of the plastic to the nail shanks. More desirably still, such a system is configured to permit the collation to be coiled for use in driving tools that accept collations in this manner.

BRIEF SUMMARY OF THE INVENTION

A fastener assembly is for use in an associated fastener driving tool for driving a fastener from the assembly into an associated substrate, such as a wood substrate. The fastener assembly includes a row of fasteners arranged substantially parallel to each other. Each fastener has a shank.

A collation system is formed from a plastic material that is molded onto and adhered to the fasteners. The plastic material defines a collar portion that captures or at least substantially encircles the fastener shank and a connecting portion extending between and connecting adjacent collar portions. The plastic material is formulated from an adhesive polymer such as a polyolefin, a polyolefin blend, an epoxy or the like. When the fastener is driven from the driving tool, the collar portion remains adhered to the fastener such that the collar portion penetrates the substrate with the fastener.

In a present strip, the polymer is a blend of polypropylene and a maleic anhydride modified polypropylene and adhesion is effected by preheating the fasteners prior to molding the plastic material to the fasteners. A preferred preheating temperature is about 450° F. and preferably about 450° F. to 600° F.

In the strip, the fasteners are parallel to one another and at an angle relative to an axis of a selected one of the fasteners.

The connecting portion can be formed as a bridge and a rib in which the bridge and rib have a generally cruciform shape. The rib can be formed parallel to the collation. Alternately, the rib can be formed at an angle (not parallel to) the collation. Alternately still, the connecting portion has an embossed pattern formed therein.

In a present strip, the collation system includes upper and lower plastic moldings adhered to the fasteners. The upper and lower plastic moldings are formed parallel to one another, with the upper molding formed nearer to the head of the fastener and the lower molding formed nearer to the tip of the fastener. The lower molding is formed on the shank of the fastener within the lower half and preferably within about ½ inch of the tip of the fastener. The plastic molding can be formed having a taper to facilitate penetration into the substrate.

A method for making a fastener assembly includes the steps of arranging a plurality of fasteners in a row parallel to one another, preheating the plurality of fasteners to elevate the temperature of the fasteners, molding a polymer material onto the preheated fasteners and between adjacent fasteners to form a plastic collation having a collar that captures or at least substantially encircles a shank of each fastener and a connecting portion between adjacent fasteners and cooling the strip to form the fastener assembly. The strip can then be post heat treated.

The fastener assembly can also be configured to influence or encourage separation of the fasteners from one another (separation of the connecting portions) at a desired location. Such a configuration further reduces debris by reducing the impact on the connecting portion by the fastener as it is driven by the tool into the substrate.

The fastener assembly includes a row of fasteners arranged substantially parallel to each other and a collation system formed from a plastic material that is molded onto and adhered to the fasteners. The connecting portion includes a preferentially weakened region to influence separation of the connecting portion from the collar at a desired location.

A preferred preferentially weakened region is at about a juncture of the connecting portion and the collar portion, and most preferred a juncture of the connecting portion and the collar portion of a subsequent fastener in the row of fasteners.

The preferentially weakened region can be formed by a notch in the connecting portion, such as at an upper edge of the connecting portion. A notch can also be formed in a lower edge of the connecting portion. The upper edge notch can have an arcuate wall.

The preferentially weakened portion can be formed by the connecting portion having a varying cross-sectional area with a smaller cross-sectional area at the desired location than at other locations in the connecting portion. The connecting portion can include a bridge and a rib, such that the varying cross-sectional area corresponds to transitions between the rib and the collar portions being formed having different radii of curvature. The preferentially weakened region can be formed by a smaller cross-sectional area at the juncture of the connecting portion and the collar portion of a subsequent fastener in the row of fasteners than at a juncture of the connecting portion and the collar of the driven fastener.

The fasteners can also be positioned eccentrically relative to their respective sleeves to define a thin-walled sleeve section at the desired location.

The assembly can also be configured with the connecting portion including a rib that extends less than an axial length of the collar portion (e.g., is not as long as the collar), and the rib can have a width that is greater than the width of the collar.

The connecting portion can include a bridge that is integral with the rib and extends substantially the axial length of the collar portion, such that the rib and bridge have a substantially cruciform shape.

The rib can be tapered, narrowing toward the tip of the fastener, and the bridge can be tapered, narrowing toward the tip of the fastener. The rib can be a relatively thick, short element disposed at about an upper portion of the bridge. The rib can have a tapered shaped, narrowing in a direction proximal to a tip of the fastener. The taper can be incorporated into a diamond shaped rib.

The assembly can include upper and lower collations parallel to and spaced from one another. In such as a configuration, the lower collation (that is the collation closer to the tip) is narrower that the upper collation. Preferably, the lower collation is about ½ of the width of the upper collation.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIGS. 6 and 6A illustrate an alternate bridge portion that is embossed, in which FIG. 6A is a cross-section taken along line 6A-6A of FIG. 6;

FIGS. 7A and 7B illustrate the locations at which a leading of driven nail is separated from the nail strip, in which FIG. 7A is a leading nail separation and FIG. 7B is a trailing nail separation;

DETAILED DESCRIPTION OF THE INVENTION

Figure 1A:
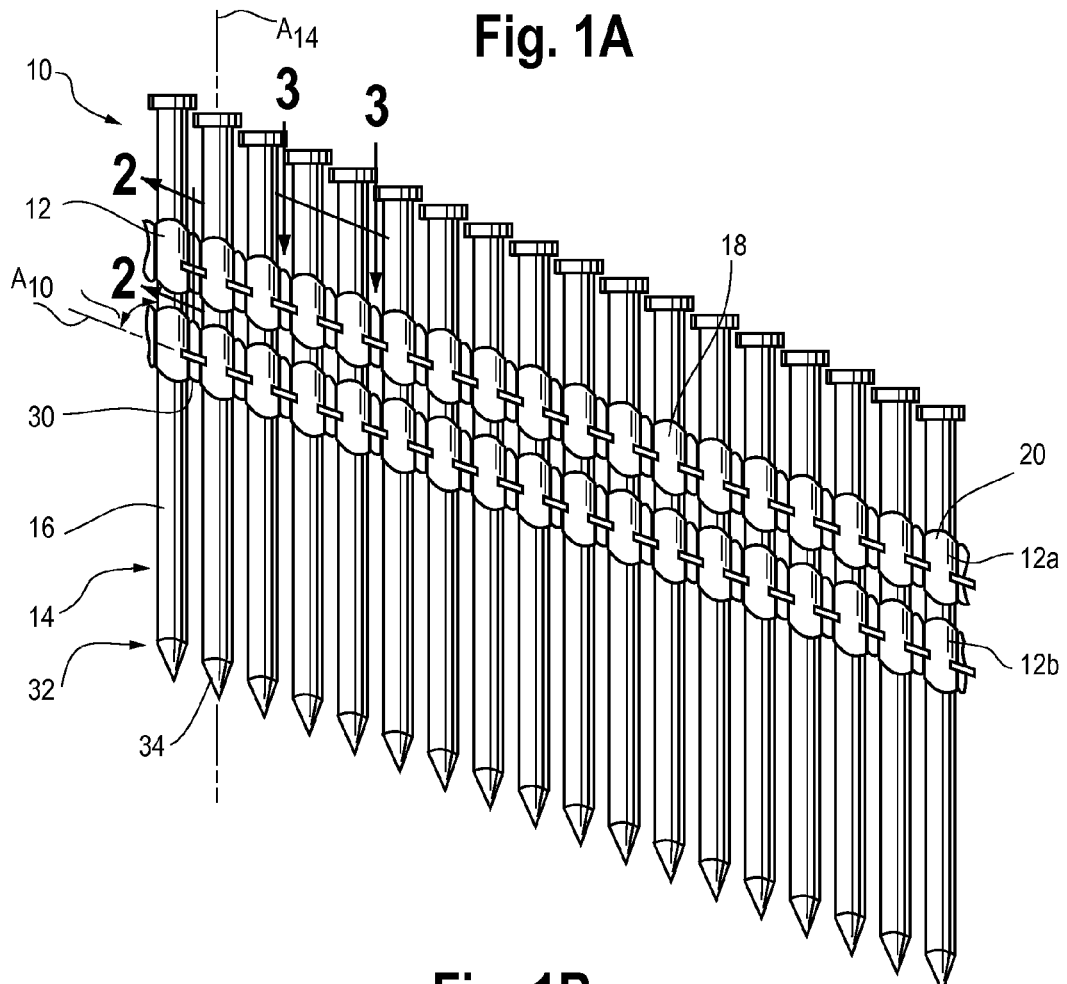
FIG. 1A is a plan view of one embodiment of a nail strip or collation having a pair of plastic molded carrier strips.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Figure 1B:
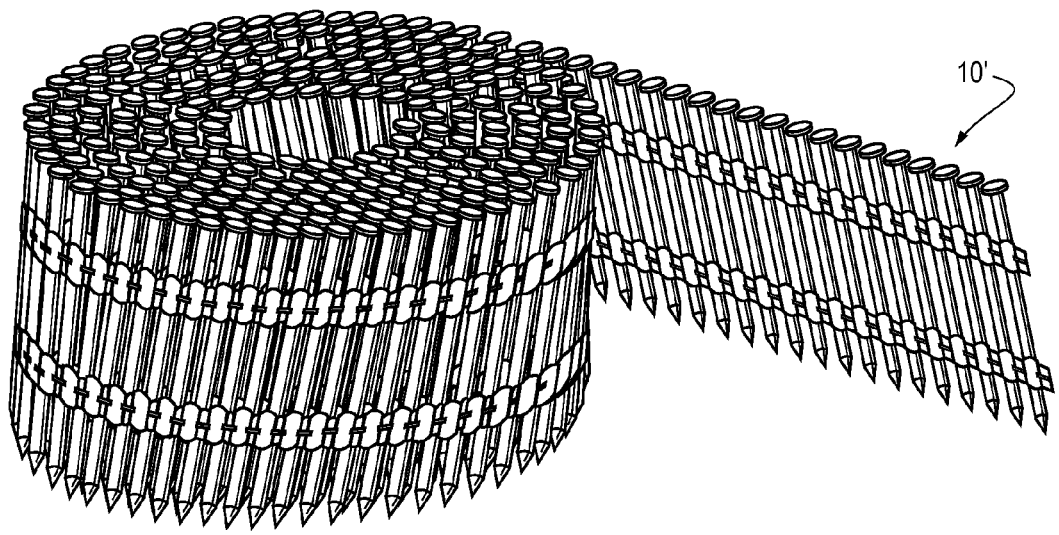
FIG. 1B illustrates a coiled collation configuration.

Referring now to the figures and in particular to FIG. 1, there is shown a nail strip 10 having a plastic collation system 12 embodying the principles of the present invention. In the illustrated strip 10, the nails 14 are positioned at an angle $\alpha$ of about 20 degrees to the transverse direction of the strip 10; however, other angles $\alpha$ (including zero degrees) are contemplated for use with the present invention. The strip in FIG. 1B is a coiled collation.

As will be appreciated by those skilled in the art, the illustrated nails 14 are full head nails, rather than D-head (or clipped head) nails. Accordingly, the nails 14 provide increased holding characteristics (due to the increased surface area of the nail head H). However, it will also be appreciated that using full head H nails 14 requires that the strip 10 is fabricated with a slightly greater distance $d_{14}$ between the (axes $A_{14}$ of the) nails 14 to accommodate the larger nail heads H.

The nails 14 are collated and held to one another by the plastic collation 12. The plastic collation 12 is molded to, over and around the shanks 16 of the nails 14, and connects each nail 14 to its adjacent nail or nails (that is, extends between the nails 14). The collation 12 is formed as a contiguous molding (as indicated generally at 18) around and between the nails 14; nevertheless, for purposes of this disclosure, the molding 18 is viewed as having a collar portion 20, which is that portion that encircles the nail shank 16, and a connecting portion 22, which is that portion that extends between and connects adjacent collar portions 20. In the nail strip 10 illustrated in FIG. 1, two plastic moldings or collations are shown, namely an upper molding or collation 12a and a lower molding or collation 12b, that are formed with structure similar to one another. The following disclosure is applicable for both of the moldings and are referred to collectively as molding or collation 12. For purposes of the present disclosure, the term molded is intended to include all methods of forming the collation 12 on or to the nails 14.

The present nail collation 12 differs from previously known plastic collations in a number of important aspects. First, rather than the plastic merely encircling and extending around and between the nails, the present collation uses a material that is molded (or formed) and adheres to the nails 14. It has been found that plastic that is adhered to the nails, rather than merely molded around the nails is advantageous in that the plastic material tends to remain on the nail shank 16 during driving. That is, the collation 12 material is maintained on the shank 16 as the nail 14 penetrates the substrate and thus enters the substrate with the nail 14. Advantageously, much less debris is generated during driving of a nail 14 from the present nail strip 10 compared to prior known nail strips.

It will also be appreciated that the adhesion of the plastic material to the nails 14 also has benefits vis-à-vis the rigidity of the nail strip 10. That is, when the plastic merely encircles the nail shanks, the plastic can slip around the nail shanks. On the other hand, by adhering the plastic molding 12 to the shanks 16, the nail strip 10 tends to become more rigid and is less likely to flex and to corrugate.

The material is an adhesive polymer, an epoxy or the like. The material can be, for example, an adhesive polyolefin such as a maleic anhydride modified polyolefin, such as polypropylene, polyethylene or the like. The material can include a blend of a polyolefin and a modified polyolefin, such as a blend of polypropylene and a maleic anhydride modified polypropylene. One or more other resins can also be used, such as a polyvinyl alcohol (PVA) based material, an ethylene vinyl alcohol (EVA) based material, an acrylonitrile butadiene styrene (ABS) based material, ionomers, methyl methacrylates and the like. Fillers can also be used as can blends of any of the materials, as suitable. Other materials will be recognized by those skilled in the art and are within the scope and spirit of the present invention.

A present plastic composition is a polypropylene resin that has been modified to enhance adhesion to surfaces, including metal surfaces. A preferred resin is a maleic anhydride modified polypropylene commercially available from Mitsui Chemicals America, Inc, of Rye Brook, N.Y., under the tradename ADMER® QF5512A.

It has been found that unexpectedly high levels of adhesion were achieved using these modified resins when the resins were applied to nails 14 that were heated to elevated temperatures prior to application of the polymer (resin). Samples of nails were prepared by preheating the nails to a temperature of about 450° F. to about 600° F., and preferably about 500° F. to 550° F. and molding the maleic anhydride modified polypropylene to the nails. These were tested against other molded nail strip compositions, in which the molding was carried out with the nails at ambient temperature and with the nails at elevated temperatures (shown as Cold and Hot under column listed as Nail Temp). Tests were also carried out with strips that were postmolding heat treated (shown in columns identified as As Extruded and After 30 Min. Bake). That is, after the plastic material has been molded to the nails, the nail strip was heated for a period of time (30 minutes) at a predetermined temperature. The results of the testing are shown in Table 1, below.

TABLE 1

PLASTIC ADHESION SHEAR STRENGTH OF VARIOUS PLASTIC NAIL COLLATIONS

| Polymer Composition | Material Tested | Nail Temp | Plastic Adhesion Shear Strength (lbs) | | Bake Temp (° F.) |
| --- | --- | --- | --- | --- | --- |
| | | | As Extruded | After 30 Min. Bake | |
| Polypropylene (PP) | Current material | Cold | 6.0 | 17.4 | 375 |
| Modified PP-anhydride | Amplify GR 205 | Cold | 6.5 | 48.4 | 300 |
| | | Cold | 6.5 | 44.4 | 350 |
| Modified PP - anhydride | Amplify GR | Cold | 0.0 | 39.9 | 300 |
| HDPE/anhydride blend | MSI | Cold | 5.3 | 3.6 | 250 |
| | | Cold | 5.3 | 90.9 | 350 |
| | | Hot | 64.0 | 86.5 | 350 |
| Modified PE-anhydride | Bynel | Cold | 6.7 | 5.9 | 250 |
| | | Cold | 6.7 | 49.4 | 350 |
| 12% vinyl acetate copolymer | Elvax | Cold | 4.5 | 12.0 | 225 |
| | | Cold | 4.5 | 15.9 | 350 |
| EMMA Copolymer (Zn) | Suryin 9150 | Warm | 0.0 | 51.2 | 375 |
| Modified PP-anhydride | Tymor CP97X110 | Cold | 8.4 | 15.6 | 350 |
| | | Cold | 8.4 | 88.0 | 375 |
| Modified PP-anhydride | Admer QF551A | Cold | 4.6 | 17.1 | 300 |
| | | Cold | 4.6 | 28.0 | 350 |
| | | Hot | 71.0 | 210.4 | 350 |
| Blend | 75% Current PP | Cold | 7.0 | 7.3 | 350 |

In Table 1, the plastic adhesion shear strength (in pounds, lbs.) was measured using a tensile testing device, by forcing the nails through a precisely sized hole in a direction parallel to the nail axis $A_{14}$ and measuring the force required to separate the nail 14 from the plastic 12. The nails that were pre-heated prior to molding were heated to a temperature of about 500° F. to 550° F., after which the plastic was molded to the nails. For the post heat treatment, the nails were heated to the temperature shown for a period of about 30 minutes.

As can be seen from Table 1, the difference in plastic shear strength between the non-pre-heated nails and the preheated nails is quite significant. For the present maleic anhydride modified polypropylene, the difference is a factor of over 15 (71.0 lbs./4.6 lbs.) without post molding heat treatment. With post molding heat treatment, the shear strength increased by a factor of almost 3 over the non-post heat treated (pre-heated) nails. The plastic shear strength was shown to be about 71.0 lbs with pre-heating the nails prior to molding the plastic to the nails. In no case did a cold-applied plastic approach the shear strength of the pre-heated nail strips.

It was observed that nails strips formed in accordance with the present invention exhibited a very limited amount of debris compared to known plastic collations, principally because the plastic remained on the nail shank and penetrated the substrate (wood) with the nail. Moreover, it was found that the debris that was generated was in the form of a finer material (smaller sized particles) so there was less of a housekeeping issue with the debris that was generated.

Debris was collected from samples of nails to determine the "debris performance", or reduction of debris generation of the present collation system. The amount of loose debris was measured by first weighing a given collated nail strip consisting of 10 nails. The starting weight of plastic was calculated by subtracting the weight of 10 uncollated nails from this amount. The test nail strip was then fired into a substrate (e.g., wood board) surrounded by an enclosure to facilitate the capture and collection of the loose debris. The collected loose debris was then weighed and divided by the original starting plastic amount to yield the percent loose debris for a particular plastic collation material.

Table 2, below, summarizes the results obtained with selected three of collating plastic materials (a non-adhesive polypropylene material, an adhesive material in accordance with the present invention that was formulated as a blend of 50 percent by weight polypropylene and 50 percent by weight of the maleic anhydride modified polypropylene, and a formulation of 100 percent of the maleic anhydride modified polypropylene). Firing tests were conducted in both pine and medium density fibreboard (MDF) substrates.

TABLE 2

DEBRIS GENERATED FROM VARIOUS PLASTIC NAIL COLLATIONS

| Plastic collating material | % Loose Debris (Pine) | % Loose Debris (MDF) |
|---|---|---|
| Non-adhesive polypropylene | 86 | 91 |
| Polypropylene/maleic anhydride modified polypropylene blend (50%/50% by weight) | 17 | 14 |
| 100% maleic anhydride modified polypropylene, | 0 | 0 |

It was also found that the nails carried the plastic into the wood and that the plastic was embedded in the wood with the nail. In fact, surprisingly, this increased the nails' holding power in the wood. It is believed that this was due to the adhesive nature of the plastic as it embedded in the wood, in conjunction with the adhesion of the plastic to the nail. That is, it is believed that the plastic (adhesive) flowed into the wood structure and bonded with the wood structure, thus providing even greater holding power.

Table 3 below shows the results of evaluations that were conducted to compare the holding power or withdrawal strength of nails that were "fired" into wood from nail strips in accordance with the present invention to non-pre-heated polypropylene or control molded nail strip collations. The withdrawal strengths were measured as the force (in lbs/in of withdrawal) required to pull the nail from the wood. The values were normalized (e.g. calculated per inch of withdrawal) by dividing the force by the penetration depth.

TABLE 3

PENETRATION AND WITHDRAWAL STRENGTH OF NAILS CARRIED IN VARIOUS PLASTIC NAIL COLLATIONS

| Sample No. | Standing Ht. (in) | Penetration (in) | Ultimate (lbs) | Withdrawal Strength (lbs./in. of withdrawal) | Plastic Collation Material |
|---|---|---|---|---|---|
| 1 | 0.258 | 2.432 | 408.73 | 168.06 | Tymor ™ |
| 2 | 0.585 | 2.415 | 372.28 | 154.14 | Tymor ™ |
| 3 | 0.618 | 2.382 | 150.06 | 63.00 | Control |
| 4 | 0.616 | 2.384 | 150.93 | 63.31 | Control |
| 5 | 0.621 | 2.379 | 231.86 | 97.46 | Admer ® |
| 6 | 0.644 | 2.356 | 127.87 | 54.27 | Control |

As can be seen from the data of Table 3, nail strips in accordance with the present invention exhibited considerably higher withdrawal strengths compared to non-adhered (control) nails. The control nails exhibited withdrawal strengths of about 54.3 to 63.3 lbs, whereas the preheated nails exhibited withdrawal strengths of about 97.5 to 168.1 lbs. In each case, the pre-heated nails required almost 54 percent greater force to withdraw or pull out the nails. At the same time, the nail penetration was essentially equal to that of the non-preheated nails. The Admer® and Tymor™ materials are both maleic anhydride modified polypropylene.

In the present nail strips 10, the plastic is a uniform material that is molded over the nail shanks 16 and between the nails 14. It will be appreciated that the plastic material can be a multi-part molding, in which discrete layers in the molding (collating) material are provided on the nails. In such a system, an adhesive can be applied or bonded to the nails onto which a layer of a material with desired characteristics (e.g., a stiffer or more rigid material or a more impact resistant material) is applied. Alternately, of course, a layered configuration can be achieved using a coextrusion of two or more plastics.

Another aspect of the present nail strip 10 is the shape or configuration of the molding around and between the nails 14. That is, the shape of the collars 20 and the connecting portions 22. In a present strip 10, the collars 20 are formed as encircling elements that have a greater longitudinal or axial length at about a midpoint $L_{20M}$ between the connecting elements 22 (that is at about the midpoint of the circle inscribed by the nail), and dip to a smaller axial length at about the connecting portions $L_{20C}$.

Figure 2:
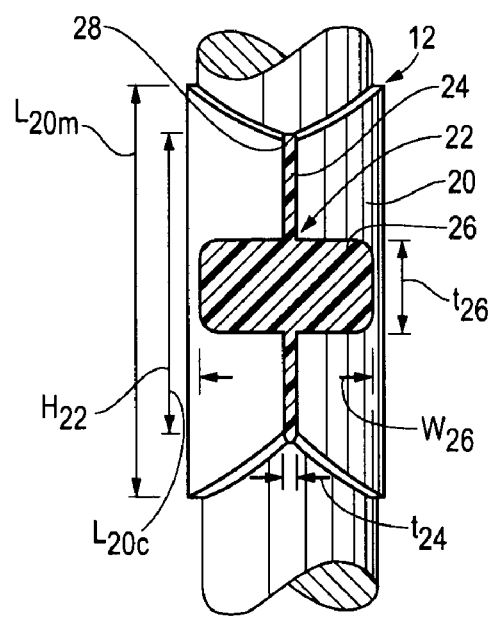
FIG. 2 is a cross-sectional view taken along line 2-2 of FIG. 1.
Figure 3:
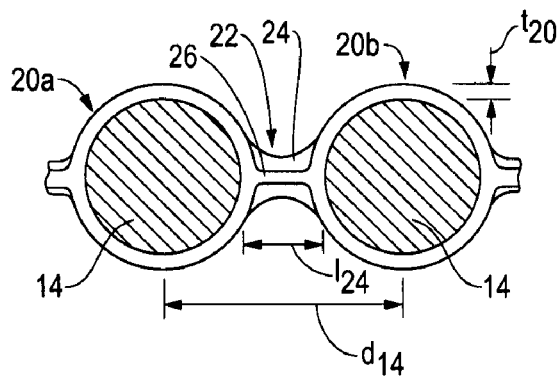
FIG. 3 is a cross-sectional view taken along line 3-3 of FIG. 1.

The connecting portions 22 include a bridge 24 that extends from one collar 20a to the adjacent collar 20b and is about the height $H_{22}$ of the collar 20 at the collar 20/connecting portion 22 juncture. The bridge 24 is a relatively long, thin element that in fact "bridges" the two adjacent collars 20a, 20b. A rib 26 runs along the bridge 24 from one collar 20a to the next 20b. The rib 26 is a cross-piece to the bridge 24 and has a low profile (e.g., is short) in the nail axial direction or along the length of the nail (i.e., has a low thickness $t_{26}$), but has a greater depth or width $w_{26}$ than the bridge 24. As seen in FIGS. 2 and 3, the cross-section of the bridge 24 and rib 26 is cruciform-shaped, and with the 26 rib serving as the cross-piece, the rib 26 resides at about the middle of the bridge 24. A cross-section taken through the nails 14 (see, FIG. 3) that provides a top or bottom view of the connecting portion 22 shows that the rib 26 actually has a concave shape as it extends between the nails 14. Both the bridge 24 and the rib 26 are formed having rounded ends, as indicated at 28.

As will be appreciated by those skilled in the art, when a nail 14 is driven from the strip 10, it is the nail 14, the collar 20 and the connecting portion 22 between the driven nail 14 and the next adjacent nail 14b (see right-hand side of FIG. 1) that are separated from the strip 10. Desirably, this entire "assembly" is driven into the substrate, and it will be understood that it is desirable to drive as much of the assembly as possible into the wood to, among other things, reduce the amount of debris that is generated.

To effect separation of the connecting portion 22, a notch 30 can be formed at the base or bottom 32 of the connecting portion 22 along a desired line of separation, or at the juncture of the connecting portion and the next adjacent nail. This provides a location at which the nail 14, collar 20 and connecting portion 22, as a unit, separate from the strip 10.

The connecting portion 22 provides the necessary rigidity to the strip 10 that, in conjunction with the adhesive characteristics of the plastic, prevents corrugation of the strip 10. Nevertheless, even with the increased adhesion and rigidity, that no significant increase in force is needed to drive the nail 14 and separate the nail 14 from the strip 10.

In a present nail strip 10, the upper and lower collations 12a,b have essentially equal dimensions. The collar 20 has a length $L_{20M}$, $L_{20C}$ of about 0.360 inches to 0.480 inches and a thickness $t_{20}$ of about 0.005 inches to 0.015. The bridge 24 has a length $l_{24}$ of about 0.280 inches to 0.420 inches and a thickness $t_{24}$ of about 0.006 inches to 0.014 inches and the rib 26 has a thickness $t_{26}$ of about 0.045 inches to 0.060 inches and a width $w_{26}$ of about 0.087 inches to 0.128 inches. It will be appreciated that because the rib 26 has a concave shape, the width $w_{26}$ varies along the length of the rib 26.

Figure 4:
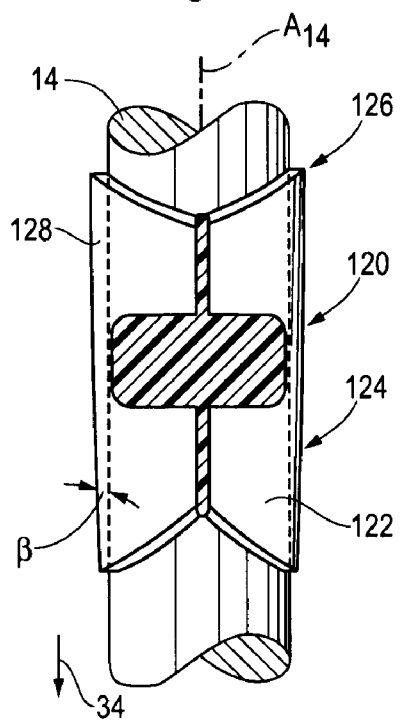
FIG. 4 is an illustration similar to FIG. 2, showing a tapered collar.

Referring to FIG. 4, the collar 120 can be formed having a taper or a thinned region 122 at the collar portion 124 closest to the tip 34 of the nail 14 or at the leading end of the collar 120. The collar 120 expands or thickens toward the trailing end 126. It has been observed that this taper 122 facilitates penetration of the nail 14 and plastic collar portion 120 into the wood. The taper 122 is preferably formed at an angle β relative to the longitudinal axis $A_{14}$ of the nail 14, of about 0.5 degree to about 5.0 degrees, and most preferably about 1.0 degrees. The taper 122 forms a wedge 128 that assists penetration of the nail 14 into the substrate and can further enhance the withdrawal resistance. It should, however, be recognized that the angle β cannot be too great in that the wedge 128 could serve to split the wood.

It has also been observed that the location of the collar 20 on the shank 16 contributes to increasing the penetration of the nail 14 into the wood. Specifically, it has been found that positioning the collar 20 closer to the tip 34 of the nail 14 results in increased nail penetration. It is believed that because the collar 20 (which is an interference to penetration) is positioned closer to the nail tip 34, the greatest interference (that is as the collar 20 is entering the wood) is encountered while the impulse from the nail driving tool is high. Accordingly, the greatest resistance to penetration is overcome while the impulse from the tool is high, and, as such, penetration of the nail is greater when the collar 20 is positioned close to the nail tip 34 rather than farther back on the nail shank 16, near to the nail head H.

An evaluation of the effect of the collar 20 position on the shank 16 was conducted. Using a nail 14 that was 3 inches long and 0.131 nominal diameter, with a collar length $L_{20M}$ of 0.5 inches and a thickness $t_{20}$ of about 0.020 inches and a collation material of maleic anhydride modified polypropylene (Admer®) and a pneumatic driving force of 90 psi, it was found that a nail 14 having a collar 20 positioned 2.25 inches from the tip 34 was driven (had a penetration of) 2.45 inches, a nail 14 having a collar 20 positioned 1.5 inches from the tip 34 was driven 2.75 inches, a nail 14 having a collar 20 positioned 0.5 inches from the tip 34 was driven 2.975 inches, and a bare nail 14 was driven 2.925 inches It will be appreciated by those skilled in the art that the use of a forward positioned collar 20 (or more generally a forwardly positioned collation element or support) is not limited to use with a collated nail strip 10. Rather, such an arrangement can be used with other strip formed fasteners and other strip-formed consumables.

Figure 5A:
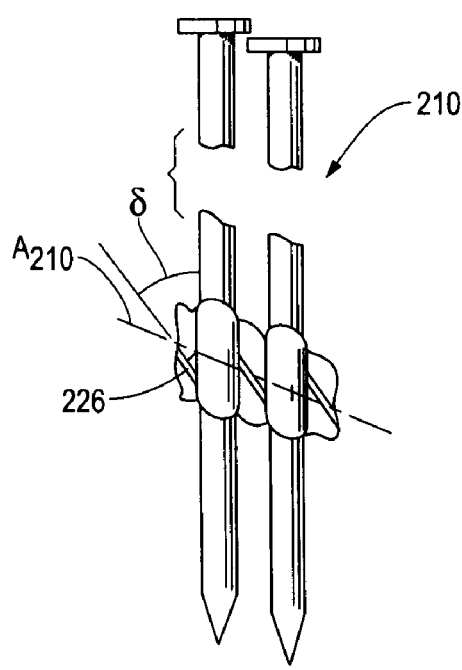
FIGS. 5A and 5B illustrate portions of strips having angled ribs.
Figure 5B:
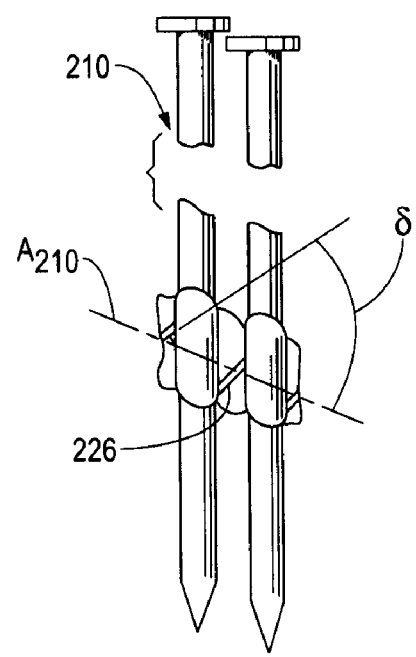

FIGS. 5A and 5B illustrate an embodiment 210 in which the ribs 226 are formed at an angle γ and γ' relative to an axis $A_{210}$ of the strip 10 (as opposed to the ribs 26 in the embodiment of FIG. 1 which are generally parallel to the axis $A_{10}$).

Figure 6:
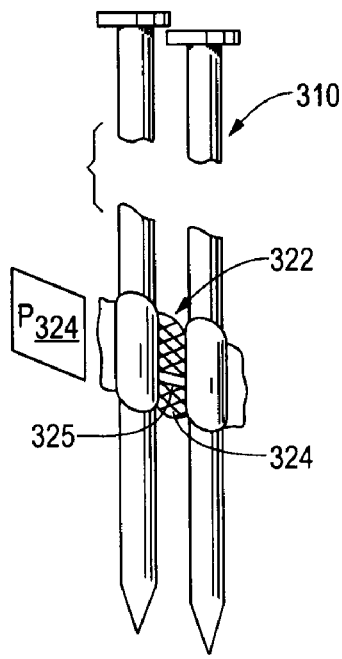
Figure 6A:
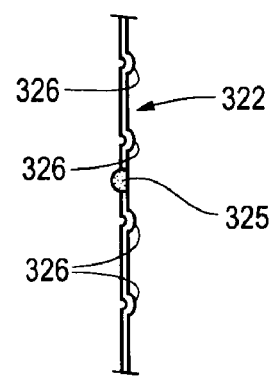

FIGS. 6 and 6A illustrate an alternate embodiment of the plastic nail collation 310 in which an embossed pattern 324 is formed in the connecting portion 322 of the strip 310, rather than the bridge 24 and rib 26 configuration (of FIGS. 1-5). In the embossed pattern 324 embodiment, a pattern of ribs 326 is formed in the connecting portion 322 that can extend in one or both directions relative to a plane $P_{322}$ that is defined by the connecting 322 portion extending between the collars 320 (e.g., into or out of or both into and out of the plane $P_{322}$ defined by the connecting portion 322 and the adjacent nails 14a,b). A cross-section of a one-directional embossing 324 is illustrated in FIG. 6A. The embossing 324 serves to provide a three-dimensional structure, much like the bridges 24 and ribs 26, to enhance the rigidity of the strip 310. In addition, it is anticipated that the embossing 324 can provide the necessary rigidity and predictability in separation while at the same time, reducing the amount of material needed to form the strip 310. A rib 325 can be used with the embossed collation embodiment 310, as well. The embossing can also be formed in the collar.

It will be appreciated by those skilled in the art from a review of the drawings that the present collation can be used with a coiled nail collation (see, FIG. 1B, which shows a coiled nail strip 10') as well. In such an arrangement, the collation is formed with a bridge connecting the collar portions, however, a reinforcing or stiffening element (e.g., rib) is not used so that the strip can be coiled. In such an arrangement, the collations can be such as those shown in FIGS. 11A and 11E, in which the connecting portions 822, 1822 include bridges 824, 1824, but no ribs. This permits the flexing of the collations as necessary to roll or coil the collation.

Figure 7A:
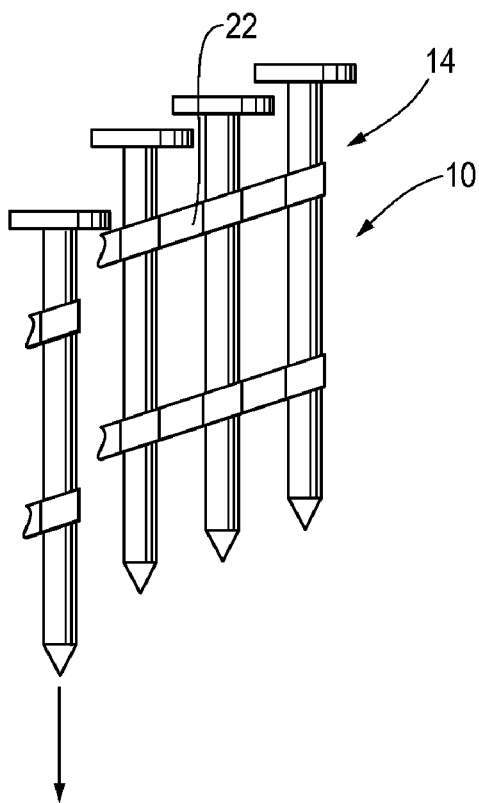
Figure 7B:
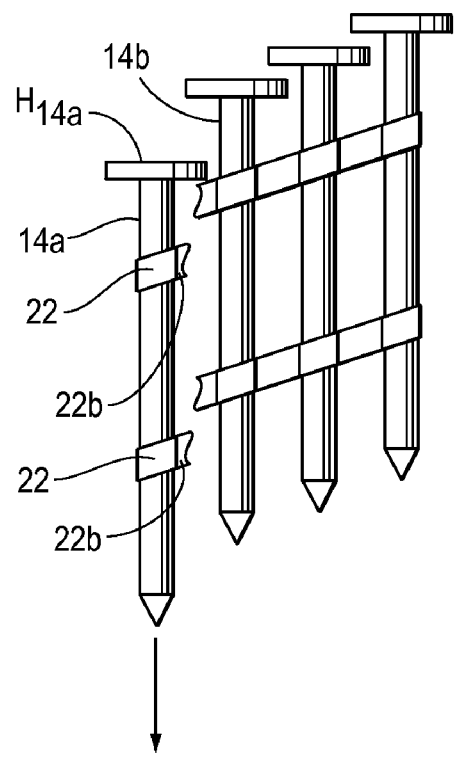

Referring to FIGS. 7A and 7B, it has been found that the amount of debris that is generated when the nail 14 is driven from the strip 10 is reduced when the nail connecting portion 22 is separated as close as possible to the next trailing nail 14b (FIG. 7B). Comparing FIGS. 7A and 7B, it can be seen that debris is reduced when the driven nail 14a is separated from the strip 10 with as much of the trailing connecting portion 22b as is practical. This is to reduce the opportunity for the downward moving head $H_{14a}$ of the driven nail 14a to contact and tear (actually, a better description is strip) the connecting portion 22 from the connecting portion 22 that remains. It will be appreciated that if the connecting portion is 22 separated as far from the driven nail 14a as possible, then little to nothing will remain for the nail head $H_{14a}$ to contact and tear from the connecting portion 22 (see for example FIG. 7B). It has been found that the portion of the connecting portion 22 that remains connected to the driven nail 14a, that is the trailing connecting portions 22b, are sufficiently strong to remain intact and attached to the nail 14a as the nail 14a is driven into the substrate.

Figure 8A:
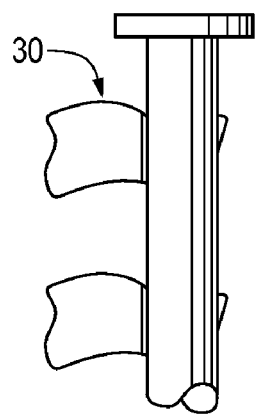
FIGS. 8A and 8B illustrate various notch locations and configurations.
Figure 8B:
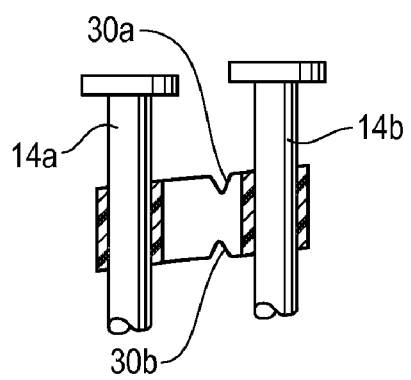

In order to provide this selectively or preferentially located separation region, a number of configurations have been examined. One such configuration is to include the notch 30 as seen in the embodiment 10 of FIG. 1 and as seen in FIGS. 8A and 8B. To effect separation of the connecting portion 22 as close to the trailing nail 14b as possible, the notch 30 should be positioned as close to the trailing nail 14b as possible.

Essentially, the strip 10 is configured with a weakened region so that separation is influenced or encouraged at a desired location. However, it should be noted that it is desirable to have the remaining portion of the connecting portion 22 remain intact as the nail 14a is driven into the substrate to reduce the debris generated. Accordingly, as seen in FIG. 8B, the notch 30 can be configured with a semi-circular notch wall 30a, and may also include a lower notch 30b to further influence separation location.

Another embodiment of the strip 410 can be configured so that separation is influenced by selectively thinning areas at which separation is desired. For example, in FIG. 9A, the bridge 424 is thinned at the trailing nail 14b collar 420 (the desired separation location) by forming a small radius transition (indicated generally at 423) between the bridge 424 and the collar 420b or the trailing nail 14b and maintaining a larger radius transition (indicated generally at 425) between the bridge 424 and the leading nail 14a (the nail to be driven)

collar 420a. The smaller radius transition is about 0.015 to 0.025 inches, whereas the larger transition radius is about 0.050 to 0.060 inches.

Figure 9A:
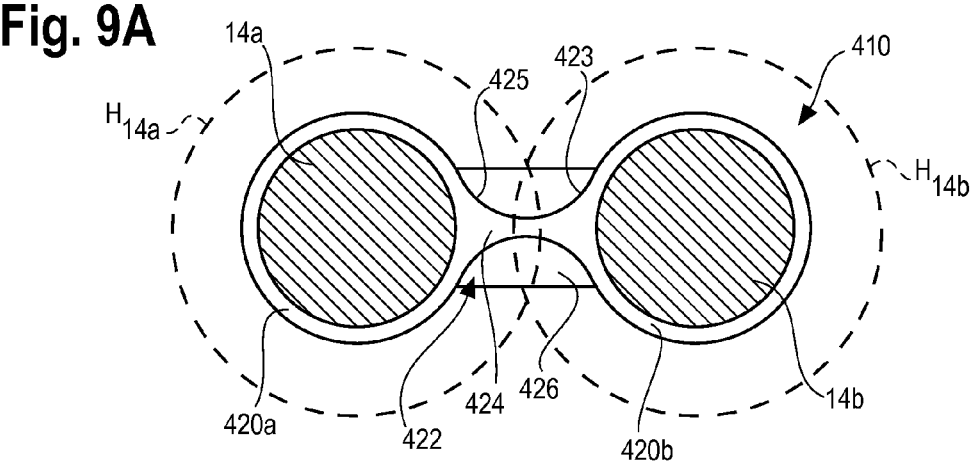
FIGS. 9A and 9B are cross-sectional views of embodiments of nail strips with concentric (FIG. 9A) and eccentric (FIG. 9B) nail placements and having large and small radius bridge to collar transitions.

The larger radius transition 425 results in more material being present at the leading nail collar 420a/bridge 424 transition. This in turn influences separation to occur closer to the transition between the bridge 424 and the trailing nail 14b (the smaller radius area with less material). In FIG. 9A the nails 14a, 14b and the connecting portion 422 are shown (with the nail heads $H_{14a}$ and $H_{14b}$ shown in phantom lines) to illustrate that the head $H_{14a}$ of the leading nail 14a is at about the same location as, e.g., overlying, the thinned bridge region 423. As such, the connecting portion 422 (that is, the bridge 424 and rib 426) is not struck by (or minimally struck by) the nail head $H_{14a}$ as it is driven from the strip 410. This, as will be appreciated by those skilled in the art, will reduce the amount of debris generated.

Figure 9B:
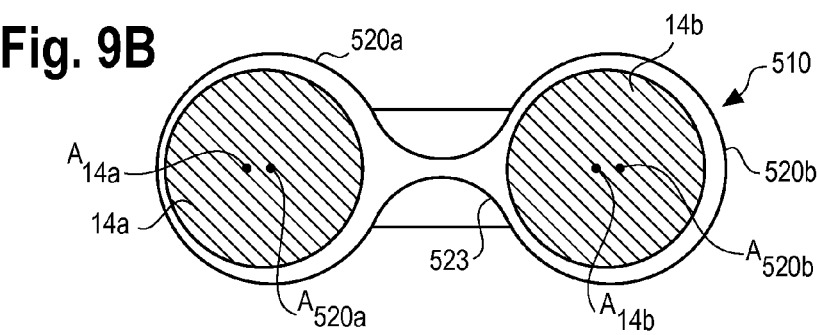

Another embodiment 510 is illustrated in FIG. 9B, which shows a variation on the large radius/small radius configuration in which the axes $A_{14a}$, $A_{14b}$ of the nails 14a, 14b are offset (or eccentric) relative to the axes of the collars 520a, 520b. In this embodiment, the nails are offset to establish a thinner collar region at the smaller radius juncture. This further influences or encourages separation as close as possible to that juncture (as indicated at 523).

Figure 9C:
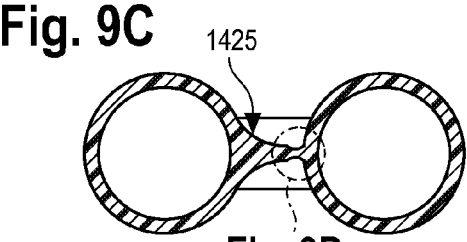
FIGS. 9C and 9D are a cross-sectional view and an enlarged partial cross-sectional view of a nail strip with a reduced thickness neck area.
Figure 9D:
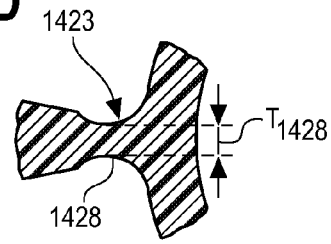

In still another embodiment illustrated in FIGS. 9C and 9D, the thinned region 1423 is provide at the trailing nail 14b transition by forming a small radius region (about 0.010 to 0.018 inches compared to the leading nail radius region 1425 of about 0.060 inches) that defines a neck region 1428. The neck can have a thickness $t_{1428}$ of, for example, about 0.0070 inches.

Figure 10A:
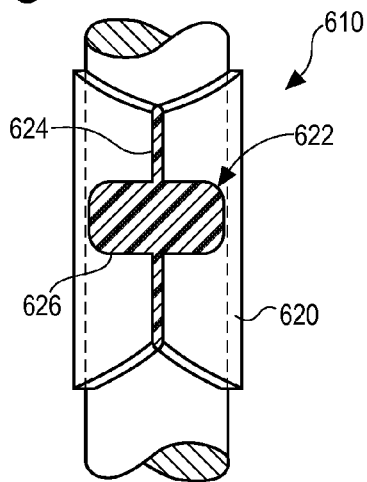
FIGS. 10A and 10B are alternate embodiments of stiff rib thin bridge (FIG. 10A) and no bridge (FIG. 10B) nail collation connecting portions.
Figure 10B:
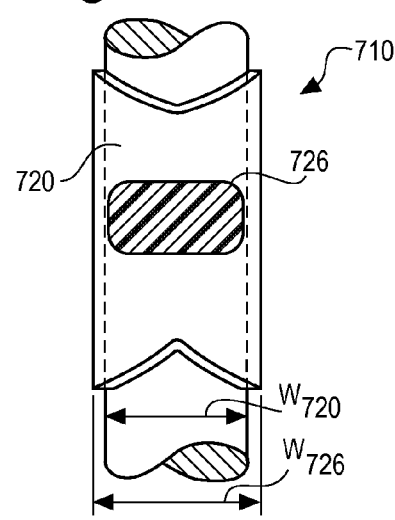

Other embodiments of the nail collation 610, 710, respectively, are seen in FIGS. 10A and 10B, in which the connecting portion 622 includes a thin bridge 624 with a relatively stiff rib 626 extending between the collar portions 620 (FIG. 10A) or even no bridge with a relatively stiff rib 726 extending between the collar portions 720 (FIG. 10B). The rib 726 can be dimensioned so that the width $w_{726}$ is greater than the width $w_{720}$ of the nail 14 and collar 720 (that is, measure across the collar 720).

Figure 11A:
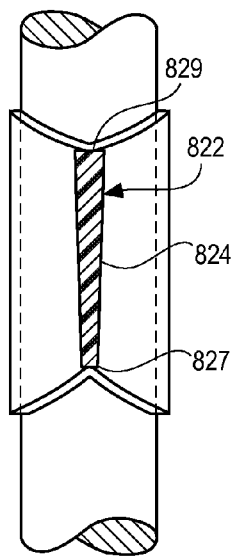
FIGS. 11A-11E illustrate embodiments of the nail collations with tapered connecting portions.
Figure 11B:
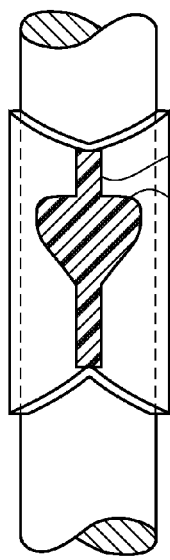
Figure 11C:
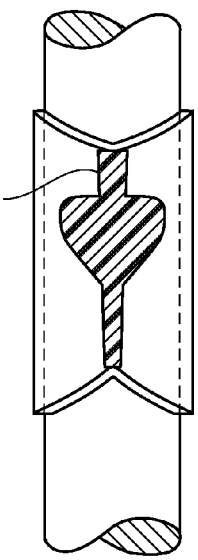

To further enhance the ability of the nail to penetrate the substrate, while maintaining a high level of confidence of the structural integrity of the plastic collations, the various structural portions of the connecting portion 22 can be tapered. As seen in FIG. 11A, the connecting portion 822 can be formed with a bridge 824 that tapers outwardly from the leading edge 827 (the edge to first enter the substrate) to the trailing edge 829. As seen in FIG. 11E, the tapered connecting portion 1822 can be inverted relative to that shown in FIG. 11A. It is anticipated that both of the rib-less configurations, those shown in FIGS. 11A and 11E will be particularly well suited for coiled applications (FIG. 1B). Alternatively, as illustrated in FIG. 11B, the rib 926 can be tapered with straight bridge section 924, or, with a tapered bridge section 1024 (FIG. 11C). The rib 1226 can be tapered on both the upper and lower ends, preferably at an angle γ of about 45 degrees, with or without a tapered bridge 1224 (FIG. 11D), to provide increased stiffness and less debris. The rib 1226 can have a thickness $t_{1226}$ of about 0.070 inches and the bridge 1224 can have a thickness $t_{1224}$ of about 0.013.

Figure 12:
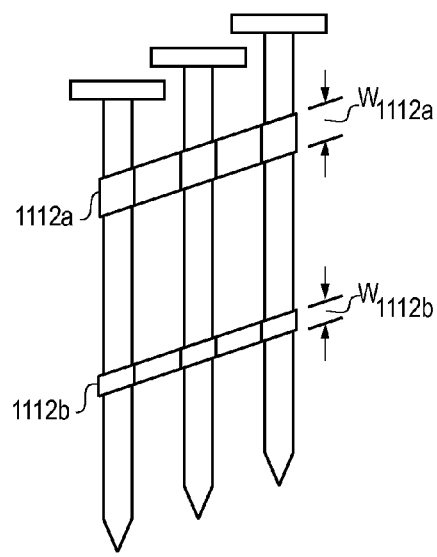
FIG. 12 illustrates still another embodiment in which the upper and lower collations have different widths.

As seen in FIG. 12, another way to reduce the amount of debris generated is to reduce the size (width) of the lower collation 1112b. In the illustrated embodiment, the lower collation 1112b width $w_{1112b}$ is about ½ of the width $w_{1112a}$ of the upper collation 1112a.

Figure 13A:
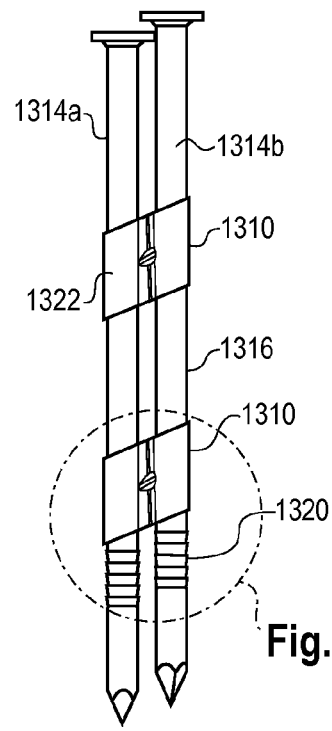
FIGS. 13A and 13B illustrate still another embodiment in which the fasteners include a penetration expanding portion.
Figure 13B:
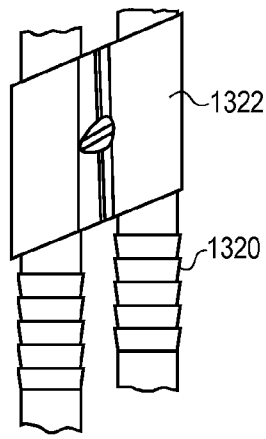

FIGS. 13A and 13B illustrate an embodiment 1310 of the strip in which the nails 1314a,b include rings or serration-like formations 1320 that extend outwardly from the nail shanks 1316, beyond an outer periphery of the shank 1316. The formations 1320 facilitate creating an enlarged opening in the substrate to ease penetration of the collation material 1322 into the substrate, without creating debris. Essentially, the rings or serration-like formations 1320 tend to further expand the opening the substrate to allow for lower-stress penetration of the collation material 1322.

Figure 14A:
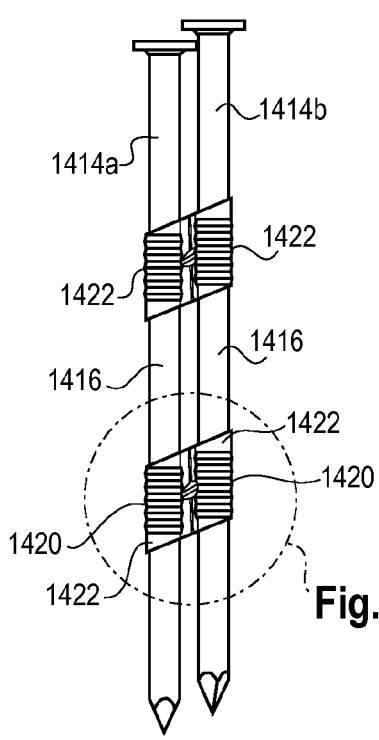
FIGS. 14A and 14B illustrate still another embodiment in which the nail shanks have deformations thereon, below the plastic carrier strips.
Figure 14B:
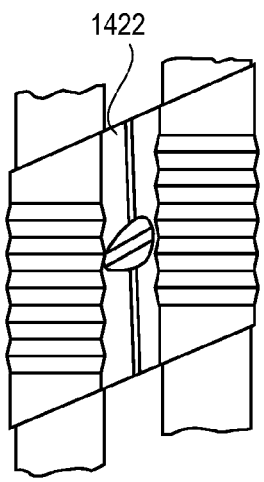

FIGS. 14A and 14B illustrate yet another embodiment 1410 in which the nail 1414 have deformations 1420 in the shanks 1416 under the collation material 1422. The deformations can be formed as rings, abraded or roughened regions, or the like, to increase adhesion of the material 1422 and the shank 1416.

Figure 15A:
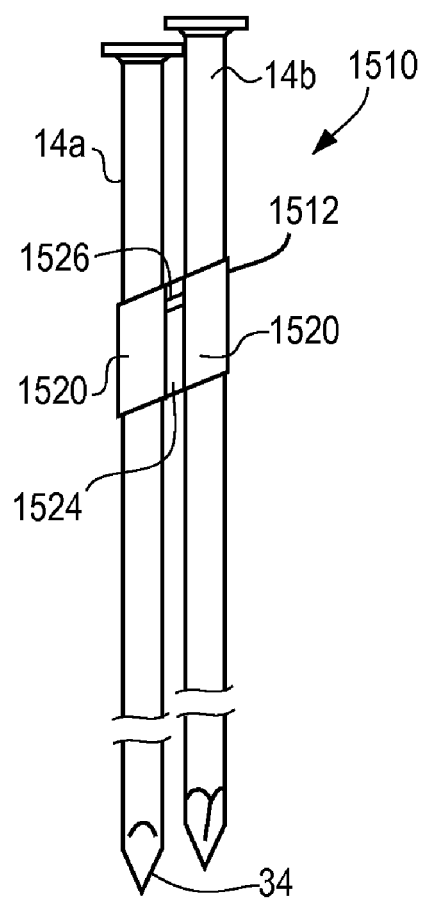
FIGS. 15A and 15B are side and partial cross-sectional views of still another embodiment of the nail collation system.
Figure 15B:
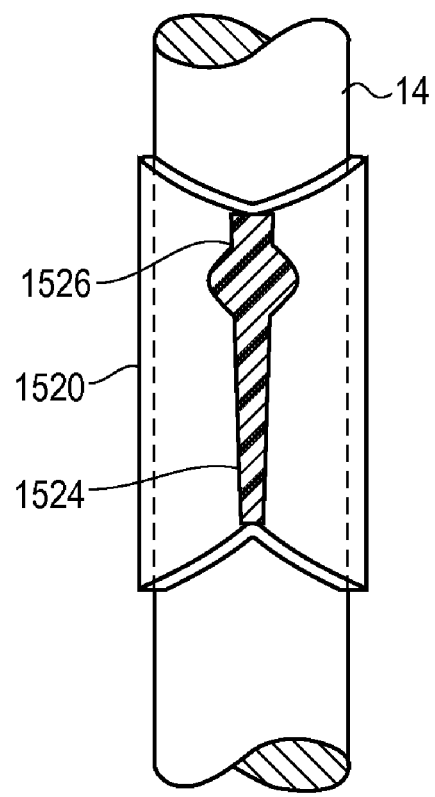

FIGS. 15A and 15B illustrate still another embodiment of the nail collation 1510. In this embodiment, the rib 1526 is formed at or near the top of the bridge 1524. In a present embodiment, the rib 1526 has a tapered shape, narrowing toward the tip 34 of the nail 14a. Again, this promotes penetration of the entirety of the nail 14a and the collar 1520 (and portions of the bridge 1524 and rib 1526, as appropriate) into the wood, to further minimize generation of debris. It has been found that following molding of the collation 1512, the rib 1526 tends to cure into the tapered shape as well. It will be appreciated that the shape of the rib 1526 can be as shown (a diamond-like shape) or any of a side variety of shapes, including but not limited to those illustrated herein. The bridge 1524 and rib 1526 are formed integral with the collar 1520 (the entirety of the collation system 1512 is formed as an integral system). The other features described above, such as the weakened or selectively weakened regions, thinned areas and the like can also be incorporated into this embodiment.

In each of these embodiments, the collation is configured so as to minimize or eliminate corrugation while at the same time, to reduce the amount of debris generated when the nail 14a is driven into the substrate.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A fastener assembly for use in an associated fastener driving tool for driving a fastener from the assembly, in sequential order, into an associated substrate, the fastener assembly comprising:

a row of fasteners arranged substantially parallel to each other, each fastener having a shank and a head, the head being larger in diameter than the shank, the shanks being spaced apart from each other so that the head of a fastener does not contact the shank of an adjacent fastener, each shank defining an axis, the fasteners each having a length; and a molded, tape-less collation system formed from a plastic material that is molded onto and adhered to the fasteners, the plastic material defining a collar portion fully encircling the fastener shank, the plastic material further defining a discrete connecting portion disposed along the shank axis extending between and connecting adjacent collar portions, the collar portion being formed on the shank a discrete length less than the length of the fastener, the connecting portion including a bridge and a rib, the bridge being a relatively thin, elongate element spanning adjacent collar portions and the rib being a relatively thick, short element disposed at about an upper portion of the bridge, wherein the collar portion and substantially the entire connecting portion remains adhered to the fastener at a location at which the collar portion is molded onto the fastener shank even after being driven into a substrate.

2. The fastener assembly in accordance with claim 1 wherein the rib has a tapered shaped, narrowing in a direction proximal to a tip of the fastener.

3. The fastener assembly in accordance with claim 2 wherein the rib has a diamond-shape and wherein a lower portion of the diamond defines the tapered shape of the rib.

4. The fastener assembly in accordance with claim 1 wherein the bridge and rib are integral with the collar portions and wherein the bridge extends substantially the axial length of the collar portion.

5. The fastener assembly in accordance with claim 1 including means for influencing separation of the connection portion from the collar portion.

6. The fastener assembly in accordance with claim 5 wherein the means for influencing separation includes selectively thinned areas in the connecting portion corresponding to the desired location.

7. The fastener assembly in accordance with claim 6 wherein the selectively thinned areas are thinned in a direction parallel to axes of the fasteners.

8. The fastener assembly in accordance with claim 7 wherein the selectively thinned areas are formed by eccentrically positioning the fasteners relative to their respective collars to define a thin-walled region and a thick-walled region of the collar.

9. The fastener assembly in accordance with claim 6 wherein the selectively thinned areas are thinned in a direction transverse to axes of the fasteners.

* * * * *

UNITED STATES PATENT AND TRADEMARK OFFICE
CERTIFICATE OF CORRECTION

| | | |
|---|---|---|
| PATENT NO. | : 8,353,658 B2 | Page 1 of 1 |
| APPLICATION NO. | : 11/935541 | |
| DATED | : January 15, 2013 | |
| INVENTOR(S) | : Heskel et al. | |

It is certified that error appears in the above-identified patent and that said Letters Patent is hereby corrected as shown below:

In The Drawings

Sheet 1 of 8, Fig. 1A, line 5 (approx.), beside Reference Number $A_{10}$ insert --$\alpha$--.

Figure 11D:
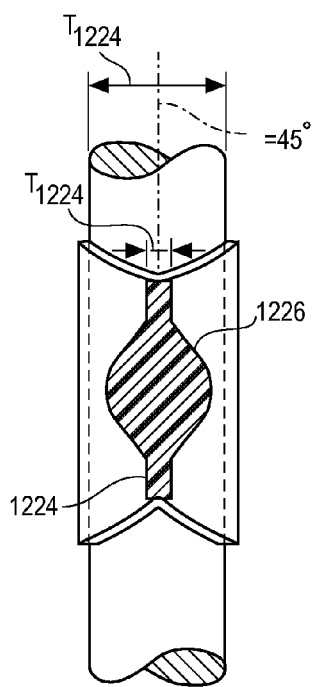
Figure 11E:
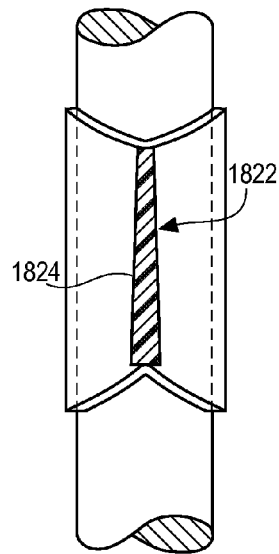

Sheet 6 of 8, Fig. 11D, line 1, "$T_{1224}$" to read as --$T_{1226}$--.

Sheet 6 of 8, Fig. 11D, line 2, "=45°" to read as --$\delta=45°$--.

In The Specification

On column 9, line 46, "inches" to read as --inches.--.

Signed and Sealed this
Eighteenth Day of November, 2014

Michelle K. Lee
*Deputy Director of the United States Patent and Trademark Office*